(12) United States Patent
Shiomi

(10) Patent No.: US 11,190,107 B2
(45) Date of Patent: Nov. 30, 2021

(54) AUXILIARY POWER SUPPLY CIRCUIT, POWER SUPPLY APPARATUS, AND POWER SUPPLY CIRCUIT

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/038,575

(22) Filed: Sep. 30, 2020

(65) Prior Publication Data

US 2021/0104950 A1 Apr. 8, 2021

(30) Foreign Application Priority Data

Oct. 8, 2019 (JP) .............................. JP2019-185141

(51) Int. Cl.
*G05F 1/10* (2006.01)
*G05F 3/02* (2006.01)
*H02M 3/335* (2006.01)
*H02M 3/07* (2006.01)
*H02M 3/158* (2006.01)

(52) U.S. Cl.
CPC ......... *H02M 3/33523* (2013.01); *H02M 3/07* (2013.01); *H02M 3/158* (2013.01)

(58) Field of Classification Search
CPC ..... H02M 3/33523; H02M 3/07; H02M 3/158
USPC ......................................................... 327/537
See application file for complete search history.

(56) References Cited

U.S. PATENT DOCUMENTS

2020/0350814 A1\* 11/2020 Nakakohara ............ H02M 3/07

FOREIGN PATENT DOCUMENTS

JP         2015-154682 A    8/2015

\* cited by examiner

*Primary Examiner* — Metasebia T Retebo
(74) *Attorney, Agent, or Firm* — ScienBiziP, P.C.

(57) ABSTRACT

An auxiliary power supply circuit is configured to receive electric power from an auxiliary power supply having a positive electrode connected to a switch node and supply electric power to a capacitor having a positive electrode connected to a reference potential node. The auxiliary power supply circuit includes; a switch element connected between the reference potential node and the switch node; and a diode having an anode connected to a negative electrode of the capacitor and a cathode connected to a negative electrode of the auxiliary power supply, a voltage of the switch node being alternately switched between (i) a first voltage substantially equal to a voltage of the reference potential node and (ii) a second voltage higher than the first voltage.

10 Claims, 4 Drawing Sheets

US 11,190,107 B2

AUXILIARY POWER SUPPLY CIRCUIT, POWER SUPPLY APPARATUS, AND POWER SUPPLY CIRCUIT

CROSS-REFERENCE TO RELATED APPLICATION

The present application claims priority from Japanese Application JP2019-185141 filed in the Japan Patent Office on Oct. 8, 2019, the content of which is hereby incorporated by reference into this application.

BACKGROUND OF THE INVENTION

1. Field of the Invention

The following disclosure relates to an auxiliary power supply circuit, a power supply apparatus, and a power supply circuit.

2. Description of the Related Art

The auxiliary power supply circuit supplies auxiliary power that assists in circuit operation. Since the auxiliary power is supplied to a plurality of different nodes, downsizing of the auxiliary power supply circuit becomes non-negligible.

Japanese Unexamined Patent Application Publication No. 2015-154682 discloses a circuit directed to downsizing of an auxiliary power supply circuit.

Specifically, Japanese Unexamined Patent Application Publication No. 2015-154682 discloses a bootstrap circuit including a diode and a capacitor.

SUMMARY OF THE INVENTION

The auxiliary power supply circuit downsized in the related art is, however, not configured to input and output a negative-voltage auxiliary power supply. According to one aspect of the present disclosure, an auxiliary power supply circuit is configured to input and output a negative-voltage auxiliary power supply.

An auxiliary power supply circuit according to one aspect of the present disclosure is configured to receive electric power from an auxiliary power supply having a positive electrode connected to a switch node and supply electric power to a capacitor having a positive electrode connected to a reference potential node. The auxiliary power supply circuit includes a switch element connected between the reference potential node and the switch node and a diode having an anode connected to a negative electrode of the capacitor and a cathode connected to a negative electrode of the auxiliary power supply. The voltage of the switch node is alternately switched between (i) a first voltage substantially equal to the voltage of the reference potential node and (ii) a second voltage higher than the first voltage.

According to another aspect of the present disclosure, a power supply circuit includes the auxillary power supply circuit according to the one aspect of the present disclosure. The auxiliary power supply circuit is configured to receive electric power from an auxiliary power supply having a positive electrode connected to a switch node and supply electric power to a capacitor having a positive electrode connected to a reference potential node. The auxiliary power supply circuit includes a first switch element connected between the reference potential node and the switch node and a diode having an anode connected to a negative electrode of the capacitor and a cathode connected to a negative electrode of the auxiliary power supply. The voltage of the switch node is alternately switched between (i) a first voltage substantially equal to the voltage of the reference potential node and (ii) a second voltage higher than the first voltage. The power supply circuit further includes a second switch element connected to the switch node. The power supply circuit has a half-bridge configuration of the first switch element and the second switch element. The power supply circuit further includes a first coil, a first transistor element, and a first rectifier element. The positive electrode of the capacitor is connected to an anode of the first switch element and one end of the first coil. The negative electrode of the capacitor is connected to a source or an emitter of the first transistor element. The first transistor element has a drain or a collector connected to the other end of the first coil and an anode of the first rectifier element. The first switch element has a cathode connected to a cathode of the first rectifier element. The power supply circuit further includes a second coil, a second transistor element, and a second rectifier element. The positive electrode of the auxiliary power supply is connected to an anode of the second switch element and one end of the second coil. The negative electrode of the auxiliary power supply is connected to a source or an emitter of the second transistor element. The second transistor element has a drain or a collector connected to the other end of the second coil and an anode of the second rectifier element. The second switch element has a cathode connected to a cathode of the second rectifier element.

DETAILED DESCRIPTION OF THE INVENTION

First Embodiment

Figure 1:
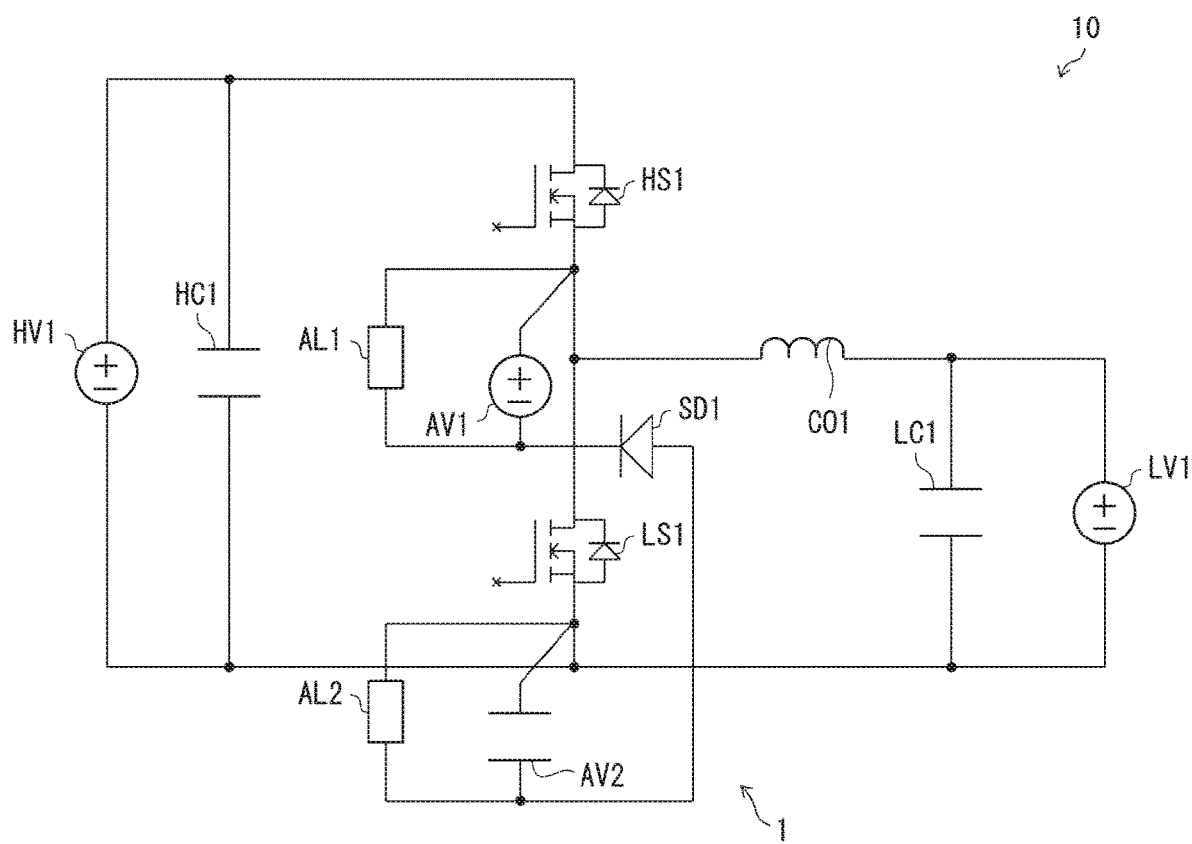
FIG. 1 is a view illustrating a circuit configuration of a power supply circuit of a first embodiment.

An auxiliary power supply circuit 1 and a power supply circuit 10 of a first embodiment will be described with reference to FIG. 1. For the sake of description, components having the same functions as components described in the first embodiment are denoted by the same reference signs as those in the first embodiment, and the description thereof will not be repeated in the subsequent embodiments. Moreover, numerical values mentioned below are mere examples.

Object of Auxiliary Power Supply Circuit 1

As described above, the auxiliary power supply circuit in the related art is not configured to input and output a negative-voltage auxiliary power supply. The negative-voltage auxiliary power supply refers to an auxiliary power supply having a positive electrode connected to a major node (e.g., a reference potential node or a switch node) of the auxiliary power supply circuit. The auxiliary power supply circuit 1 of the first embodiment is implemented in order to input and output the negative-voltage auxiliary power supply.

Definition of Terms

Before the auxiliary power supply circuit 1 is described, terms are defined as described below in the present specification.

The term "power supply circuit" refers to a circuit configured to perform electric power conversion from an input-side power supply toward an output-side power supply. The power supply circuit is, for example, a circuit configured to perform electric power conversion from a power supply of AC 230 V toward a power supply of DC 400 V. The electric power conversion includes, for example, publicly known alternating current to direct current conversion or alternating current frequency conversion.

The term "power supply apparatus" is an apparatus Including the power supply circuit.

The term "power supply" refers no energy (electric power) output from the power supply circuit or the power supply apparatus. The power supply is not a circuit element in a strict sense but is represented by a power supply symbol in a circuit diagram.

The term "auxiliary power supply circuit" refers to an auxiliary power supply circuit provided in a circuit to operate the power supply circuit or the power supply apparatus.

The term "auxiliary power supply" refers to energy (electric power) output from the auxiliary power supply circuit. The auxiliary power supply is not a circuit element in a strict sense but is represented by a power supply symbol or a capacitor symbol in the circuit diagram.

The term "rectifier element" refers to an element configured to make a current flow in only one direction. Examples of the rectifier element include a diode.

Another example of the rectifier element may be a transistor. Specifically, in the case of the rectifier element being a transistor, the rectifier element conducts a current from the source to the drain and shuts off a current from the drain to the source when the gate is OFF. Thus, in the another example, (i) the source may be considered the anode, and (ii) the drain may be considered the cathode.

The term "transistor element" refers to an element configured to switch between causing and not causing a current to flow from the drain toward the source depending on gate-ON/OFF of a Metal Oxide Semiconductor Filed Effect Transistor (MOSFET). Note that when the element is a bipolar transistor, an Insulated Gate Bipolar Transistor (IGBT), or the like, (i) the drain may be considered the collector, and (ii) the source may be considered the emitter.

The term "switch element" refers to an element configured to vary the voltage of an arbitrary node (e.g., a switch node). Examples of the switch element include the rectifier element and the transistor element. Examples of the switch element further include magnetic elements (e.g., a winding wire and a coil of a transformer).

Schema of Configuration of Power Supply Circuit 10

The power supply circuit 10 is a bi-directional DCDC converter configured to bi-directionally transmit electric power between a high voltage power supply and a low voltage power supply. The power supply circuit 10 includes (i) the auxiliary power supply circuit 1 and (ii) a load for use in a test that consumes electric power of the auxiliary power supply. The load is used to check operation of the auxiliary power supply, and when the power supply circuit 10 is actually used, the load is replaced by an arbitrary circuit (see also second embodiment).

Configuration of High Voltage Unit of Power Supply Circuit

The high voltage unit includes a power supply HV1 and a capacitor HC1. In the following description, to simplify the description, for example, the "power supply HV1" is also simply referred to as "HV1". The (+) side of the power supply symbol indicates a positive electrode side, and the (−) side of the power supply symbol indicates a negative electrode side. The voltage of the negative electrode of the HV1 is 0 V, and the voltage of the positive electrode of the voltage is 400 V. The HC1 has an electrostatic capacitance of 1 mF.

In the first embodiment, 0 V is a reference potential. A node having 0 V is referred to as a reference potential node.

Configuration of Low Voltage Unit of Power Supply Circuit 10

The low voltage unit includes a power supply LV1, a capacitor LC1, and a coil CO1. The voltage of the LV1 is 200 V. The LC1 has an electrostatic capacitance of 1 mF. The CO1 has an inductance of 1 mH, and the CO1 has an average current of about 12 A. The LV1 is designed to have a voltage ½ times the voltage of the HV1.

Configuration of Switch Unit of Power Supply Circuit 10

The switch soft includes a switch element HS1 (a second switch element) and a switch element LS1 (a first switch element). Thus, the power supply circuit 10 has a half-bridge configuration of the HS1 and the LS1.

A connection point between the HS1 and the LS1 is the switch node. The switch node is connected to one end of the CO1. Switching of the LS1 alternately switches the voltage of the switch node between a first voltage and a second voltage at a frequency of 100 kHz.

The first voltage and the second voltage each represent the voltage of the switch node with respect to the reference potential. The first voltage is a voltage substantially equal to the reference potential (about 0 V). The second voltage is a voltage higher than the first voltage. In the first embodiment, the second voltage is about 400 V.

The first voltage of the present specification means a voltage within a range of ±5 V with respect to the reference potential. In the example of the first embodiment, the first voltage is a voltage ranging from −5 V to 5 V. The range of the first voltage depends on a voltage drop amount of a switch element (e.g., the LS1).

The HS1 and the LS1 are each a cascade GaN-HEMT. In the example of FIG. 1, the cascade GaN-HEMT is represented by the circuit symbol of MOSFET. The HS1 and the LS1 each have a drain breakdown voltage of 650 V and an ON resistance of 50 mΩ.

Configuration of Auxiliary Power Supply Circuit 1 of Power Supply Circuit 10

As described above, the auxiliary power supply circuit 1 includes the LS1, an auxiliary power supply AV1, an auxiliary power supply AV2 (which is also referred to as a capacitor in the first embodiment), and a diode SD1.

Specifically, the auxiliary power supply circuit 1 is configured to receive electric power from the AV1 having a positive electrode connected to the switch node. Moreover, the auxiliary power supply circuit 1 is configured to supply (transmit) electric power to the AV2 having a positive electrode connected to the reference potential node. In the example of FIG. 1, an upper terminal of the AV2 is the positive electrode of the AV2. Thus, the auxiliary power supply circuit 1 inputs and outputs the negative-voltage auxiliary power supply to and from the reference potential node and the switch node.

The LS1 is connected between the reference potential node and the switch node. The SD1 has an anode connected to a negative electrode of the AV2 (a lower terminal of the AV2). Moreover, the SD1 has a cathode connected to a negative electrode of the AV1.

The AV1 is the auxiliary power supply output from a flyback circuit (not shown) including an insulation transformer. The AV1 is an auxiliary power supply of −15 V with respect to the switch node. The AV2 is an auxiliary power supply of −15 V with respect to the reference potential node. The AV2 has an electrostatic capacitance of 100 μF. The SD1 has a forward voltage (VF) of 0.7 V at the time point of starting conduction. The SD1 has a resistance of 0.1Ω in a conduction state.

In order to prove operation of the auxiliary power supply circuit 1, the first embodiment includes resistors AL1 and AL2 serving as loads connected to the auxiliary power supply circuit 1. The AL1 and the AL2 each have a resistance value of 7.5Ω. The AL1 is connected in parallel to the AV1. The AL2 is connected in parallel to the AV2.

Description of Operation of Power Supply Circuit 10

The power supply circuit 10 operates in the same manner as a general bi-directional DCDC converter. Specific step-down operation of the power supply circuit 10 is as described below. In the following description, the LS1 is turned off in advance.

(1) First of all, turning on of the HS1 causes a current to flow from the positive electrode of the HV1 via the HS1, the CO1, and the LV1 toward the negative electrode of the HV1. At this time, the voltage of the switch node increases to the voltage (second voltage) of the HV1. Then, turning off of the HS1 causes a current to flow from the negative electrode of the LV1 via the LS1 and the CO1 toward the positive electrode of the LV1. At this time, the voltage of the switch node decreases substantially to a reference potential (first voltage). In the step-down operation, the operation (1) and the operation (2) are repeated in order.

On the other hand, in step-up operation of the power supply circuit 10, switching ON/OFF of the LS1 causes a current to flow from the LV1 toward the HV1. Also the step-up operation, the voltage of the switch node is alternately switched between the first voltage and the second voltage in a similar manner to the case of the above-described step-down operation.

Description of Drawings Illustrating Operation of Auxiliary Power Supply Circuit 1

Figure 2:
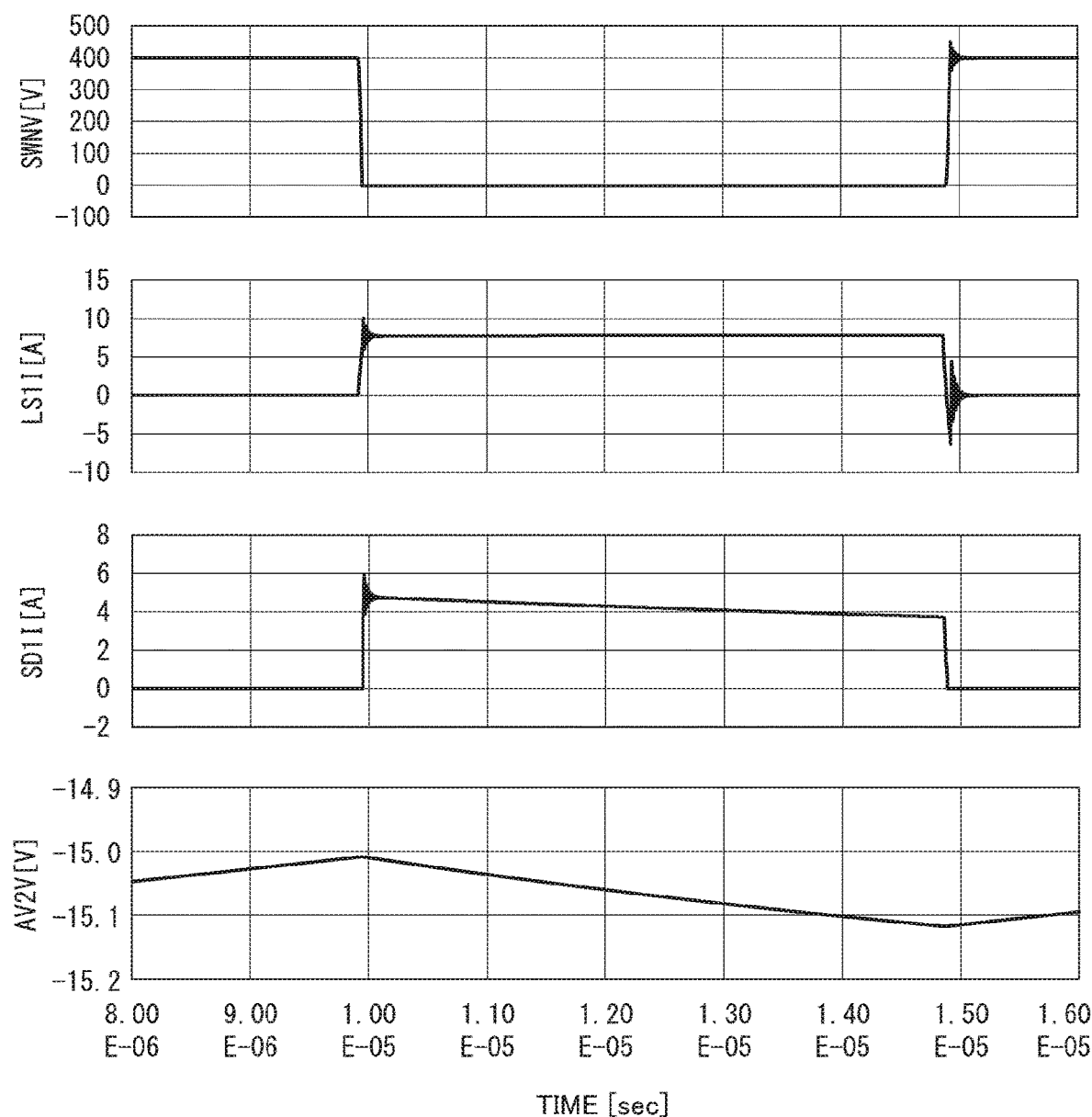
FIG. 2 is a view illustrating waveforms of voltages and currents of an auxiliary power supply circuit.
Figure 3:
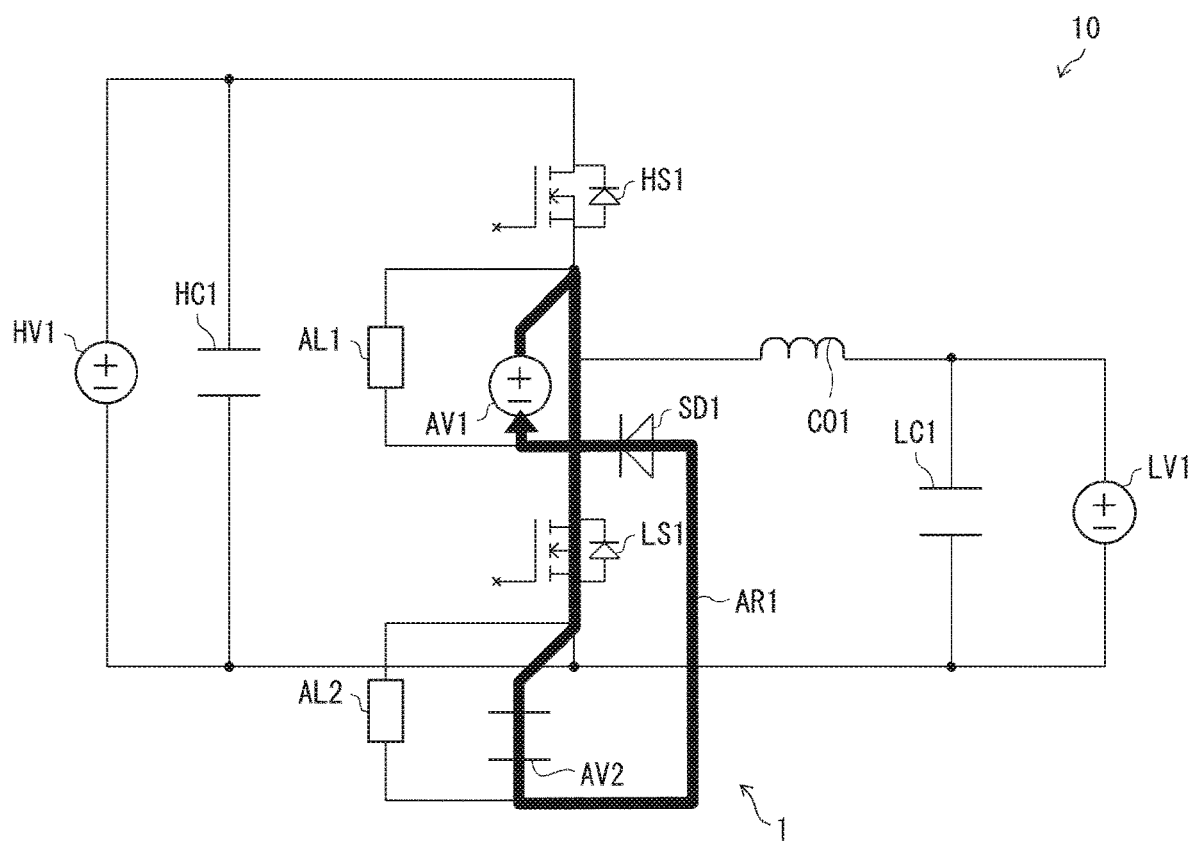
FIG. 3 is a view illustrating a path of a charge current of the auxiliary power supply circuit.

With reference to FIGS. 2 and 3, operation of the auxiliary power supply circuit 1 will be described. FIG. 2 shows a graph illustrating four waveforms of voltages and currents of the auxiliary power supply circuit 1. These waveforms are shown on a common time axis (abscissa axis). The four waveforms are:

SWNV (switch node voltage): The voltage of the switch node with respect to the reference potential;
LS1I (current of LS1): A current flowing from the reference potential node toward the switch node;
SD1I (current of SD1): A current flowing from the anode toward the cathode; and
AV2V (voltage of AV2): The voltage of negative electrode of the AV2 when the positive electrode of the AV2 is a reference.

FIG. 3 is a view illustrating a current path when the AV2 is charged.

Driving Method of Auxiliary Power Supply Circuit 1

In the driving method of the auxiliary power supply circuit 1, the following three steps are performed in this order.

First step: A step of reducing the SWNV substantially to a reference potential (first voltage)
Second step: A. step of causing the SD1I to flow to charge the AV2
Third step: A step of increasing the SWNV to a prescribed voltage (second voltage)

First step: Reducing SWNV Substantially to Reference Potential

Before the first step, turning on of the HS1 charges the parasitic capacitance of the LS1, which increases the voltage of the LS1. Thus, the SWNV reaches 400 V. In this state, turning off of the FiS1 causes a rectified current to flow to the PSI. Due to the current, the parasitic capacitance of the LS1 is discharged, and thus, the voltage of the LS1 decreases. As a result, the SWNV decreases substantially to a reference potential. The time point "approximately 1.00E-5 sec" in FIG. 2 corresponds to a time point of this decrease. After this time point, the positive electrodes of the AV1 and the AV2 each have the reference potential.

Second Step: Step of Causing SD1I to Flow to Charge AV2

Subsequently to the decrease in the SWNV, the SD1I flows to charge the AV2. This is realized based on the following factors.

The AV2 is a capacitor. Thus, along with energy consumption by the AL2, the voltage of the AV2 decreases. On the other hand, the AV1 is the output power supply of the auxiliary power supply circuit including the insulation transformer. Thus, the voltage of the AV1 does not decrease. As a result, the voltage of the AV2 becomes lower than the voltage of the AV1.

Thus, when the voltages of the respective positive electrodes of the AV1 and the AV2 reach the reference potential, a current flows from the AV1 to the AV2 whose voltage is lower than the voltage of the AV1. The arrow AR1 in FIG. 3 corresponds to the current path. Since the current flows via the SD1, measuring the SD1I enables the charge voltage of the AV2 to be identified.

It is confirmed that the SD1I flows during the time period "approximately from 1.00E-5 to 1.50E-5 sec" in FIG. 2. Moreover, it is confirmed that the AV2V is charged from −15 V toward −15.1 V during this time period.

Third step: Increasing SWNV to Prescribed Voltage

After the AV2 is charged, the voltage of the SWNV is increased. Turning on of the SSI charges the parasitic capacitance of the LS1, which increases the voltage of the LS1. This increases the SWNV to about 400 V. Thus, the potential difference between the respective positive electrodes of the AV1 and AV2 is about 400 V. Therefore, the SD1I does not flow from the negative electrode (about −15 V) of the AV2 toward the negative electrode (385 V) of the AV1. That is, charging of the AV2 is once stopped.

Improved Points 1 to 3 for Operation of Auxiliary Power Supply Circuit 1

A plurality of preferable improved points are applied to the first embodiment. These preferable improved points will be described below.

Improved Point 1: The absolute value of the voltage of the AV1 is less than the second voltage.

In the example of the first embodiment, the second voltage of the switch node is about 400 V. On the other hand, the absolute value of the voltage of the AV1 is 15 V and is less than 400 V.

If the absolute value of the voltage of the AV1 is greater than the second voltage (e.g., when the absolute value of the voltage of the AV1 is 450 V), a high voltage may be applied to the LS1. Specifically, when the AV1 is activated in a state where the power supply circuit 10 is stopped, a current that charges the parasitic capacitance of the LS1 flows via the SD1, and the switch node voltage increases to 450 V. The path of the current is shown by the arrow AR1 in FIG. 3.

Basically, the switch node voltage is assumed to be 400 V. Thus, when the switch node voltage increases to 450 V as in the example described above, an overvoltage may damage the LS1. Thus, the absolute value of the voltage of the AV1 may be less than the second voltage.

Improved Point 2: Parasitic capacitance of SD1 is less than or equal to 1/20 of electrostatic capacitance of AV2.

In the example of the first embodiment, the parasitic capacitance of the SD1 is 30 PF. When the switch node voltage increases, a reverse voltage is applied to the SDA. At this time, a charging current in accordance with the parasitic capacitance of 30 pF flows from the negative electrode of the AV2 to the reference potential node. Thus, the AV2 is discharged, and as a result, the absolute value of the voltage of the AV2 decreases. Thus, the parasitic capacitance of the SD1 may be set small.

Thus, in the first embodiment, the parasitic capacitance of the SD1 is set to be smaller than or equal to 5% (1/20) of the electrostatic capacitance of the AV2. Setting the parasitic capacitance of the SD1 as described above enables the decrease rate of the absolute value of the voltage of the AV2 resulting from the discharge to be reduced to be within the range of about 5% (within a range that may be regarded as an error).

Improved point 3: When a current flows from the reference potential node via the LS1 to the switch node, a current flows from the negative electrode of the AV2 via the SD1 to the negative electrode of the AV1T.

The LS1 serves as the rectifier element to cause a rectified current to flow toward the CO1, thereby causing conduction loss in the LS1. The direction of the rectified current is a direction from the reference potential node toward the switch node. On the other hand, the direction of the charging current (SD1I) of the AV2 is a direction opposite to the direction of the rectified current at the location of the LS1. Thus, the current that flows through the LS1 is canceled by the SD1I. As a result, the conduction loss in the LS1 is reduced.

The LS1I after the cancellation is confirmed during the time period "about 1.00E-5 to 1.50E-5 sec" in FIG. 2. A current (current of the CO1) of 12 A is intrinsically supposed to flow, but it is confirmed that the current is reduced by about 4 A and becomes about 8 A. That is, the charging current (4 A of the SD1I) of the AV2 reduces the LS1I by about 4 A.

Second Embodiment

An auxiliary power supply circuit (e.g., an auxiliary power supply circuit 1) according to one aspect of the present disclosure may also be used to reduce switching loss caused by each of an HS1 and an LS1. Specifically, reducing a transient current generated at the time of switching each of the HS1 and the LS1 enables the switching loss to be reduced. The transient current generated at the time of the switching refers to, for example, (i) a recovery current or (ii) a charging current of parasitic capacitance.

Figure 4:
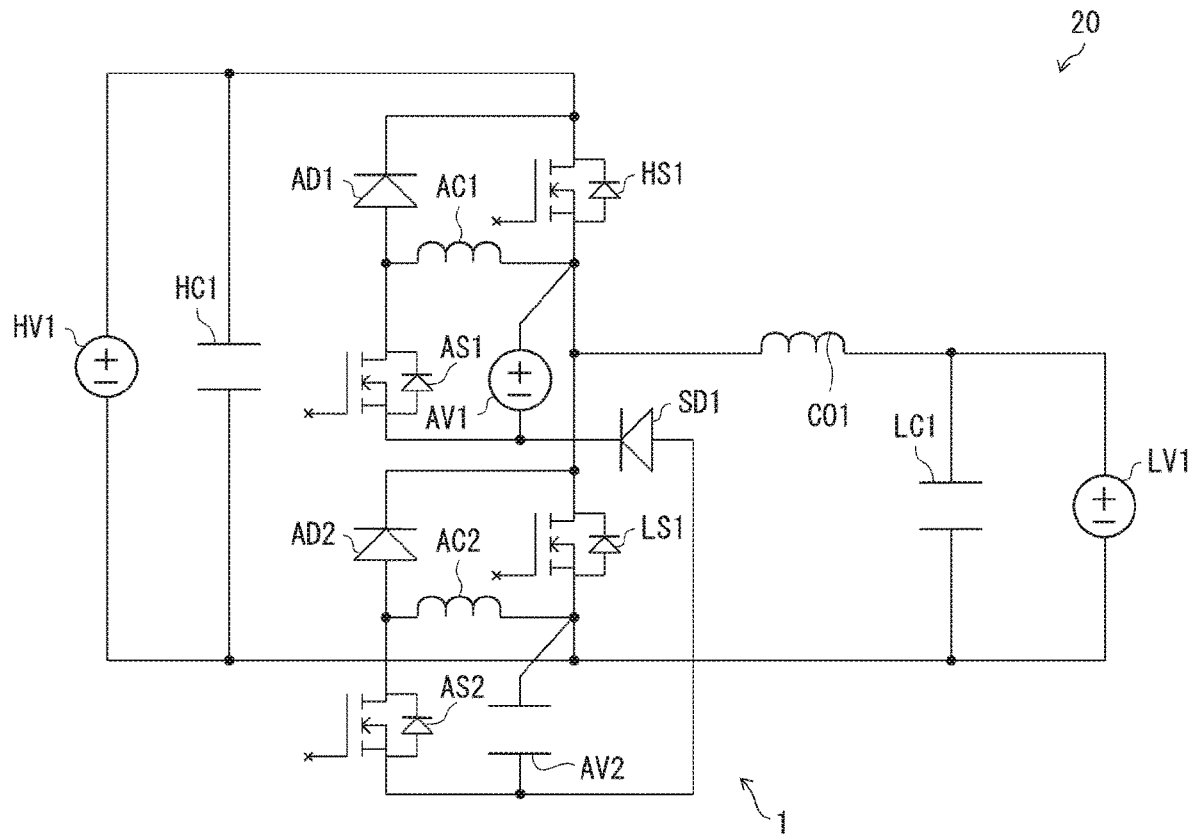
FIG. 4 is a view illustrating a circuit configuration of a power supply circuit of a second embodiment.

A power supply circuit 20 of FIG. 4 is a bi-directional DCDC converter as in the case of the power supply circuit 10. The power supply circuit 20 includes, an place of the AL1 of the power supply circuit 10, a circuit configured to reduce the transient current generated in the HS1. The circuit configured to reduce the transient current generated in the HS1 is hereinafter also referred to as a second transient current reducing circuit.

Similarly, the power supply circuit 20 includes, in place of the AL2 of the power supply circuit 10, a circuit configured to reduce a transient current generated in the LS1. The circuit configured to reduce the transient current generated in the LS1 is hereinafter also referred to as a first transient current reducing circuit.

First of all, the second transient current reducing circuit will be described. The power supply circuit 20 includes an auxiliary switch AS1 (second transistor element), an auxiliary coil AC1 (second coil), and an auxiliary diode AD1 (second rectifier element). The second transient current reducing circuit includes the AS1, the AC1, and the AD1. The second transient current reducing circuit is provided for an AV1.

The second transient current reducing circuit reduces, by the method described below, the transient current generated in the HS1. First of all, the AS1 is turned on before the transient current flows, thereby causing energy of the AV1 to flow to the AC1 and converting the energy into magnetic energy. Subsequently, the AS1 is turned off to change the magnetic energy to a current that passes through the AD1 and to cause the current to flow to the HS1, thereby reducing the transient current. Specifically, the transient current is reduced by a current corresponding to the current that passes through the AD1.

Subsequently, the first transient current reducing circuit will be described. The first transient current reducing circuit is a transient current reducing circuit which is paired with the second transient current reducing circuit. The power supply circuit 20 includes an auxiliary switch AS2 (first transistor element), an auxiliary coil AC2 (first coil), and an auxiliary diode AD2 (first rectifier element). The first transient current reducing circuit includes the AS2, the AC2, and the AD2. The first transient current reducing circuit is provided for an AV2. The first transient current reducing circuit operates in a similar manner to the second transient current reducing circuit to reduce the transient current generated in the LS1.

In particular, the reduction in the transient current of the HS1 by the second transient current reducing circuit is effective during the step-up operation of the power supply circuit 20. On the other hand, the reduction in the transient current of the LS1 by the first transient current reducing circuit is effective during the step-down operation of the power supply circuit 20.

Using the auxiliary power supply circuit 1 reduces the transient current both during the step-up operation and during the step-down operation of the power supply circuit 20.

Third Embodiment

A power supply circuit (e.g., a power supply circuit 10) according to one aspect of the present disclosure is applicable to various types of power supply circuits. Application examples of the power supply circuit 10 include an inverter circuit and Power Factor Correction (PFC) circuit.

Figure 5:
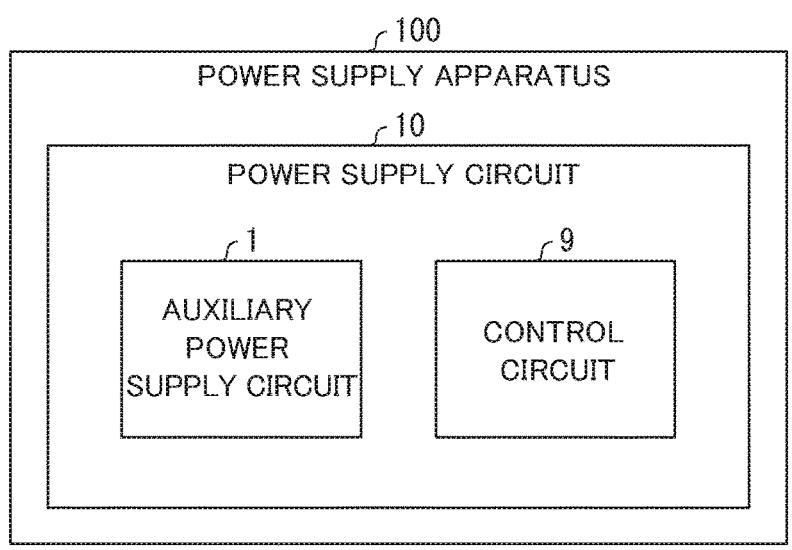
FIG. 5 is a view illustrating a power supply apparatus according to a third embodiment.

FIG. 5 is a view illustrating a power supply apparatus 100 including the power supply circuit 10. According to an power supply circuit 1, an auxiliary power supply circuit compatible with a negative voltage is provided to the power supply circuit 10 and the power supply apparatus 100. More over, the power supply circuit 10 includes a control circuit 9. The control circuit 9 controls switching ON/OFF of each element included in the power supply circuit 10. In particular, the control circuit 9 controls switching ON/OFF of an HS1 and an LS1.

SUMMARY

The auxiliary power supply circuit according to a first aspect of the present disclosure is configured to receive electric power from an auxiliary power supply having a positive electrode connected to a switch node and supply electric power to a capacitor having a positive electrode connected to a reference potential node. The auxiliary power supply circuit includes a switch element connected between the reference potential node and the switch node and a diode having an anode connected to a negative electrode of the capacitor and a cathode connected to a negative electrode of the auxiliary power supply. The voltage of the switch node is alternately switched between (i) a first voltage substantially equal to the voltage of the reference potential node and (ii) a second voltage higher than the first voltage.

With this configuration, the voltage of the switch node is switched to the first voltage (e.g., reference potential) to charge a capacitor from the positive electrode of the auxiliary power supply via the switch element and the diode. On the other hand, when the voltage of the switch node is switched to the second voltage, a current is suppressed from flowing from the switch node to the auxiliary power supply circuit. Specifically, the diode interrupts the current in a path via the diode and the capacitor. Moreover, in a path via the switch element, the voltage of the switch node is the second voltage (voltage higher than the first voltage), and therefore, no current flows through the path.

In an auxiliary power supply circuit according to a second aspect of the present disclosure, the voltage of the auxiliary power supply may have an absolute value less than the second voltage.

With this configuration, the auxiliary power supply is suppressed from applying an overvoltage to the switch element.

In an auxiliary power supply circuit according to a third aspect of the present disclosure, parasitic capacitance of the diode may be less than or equal to $1/20$ of electrostatic capacitance of the capacitor.

This configuration enables the voltage reduction of the capacitor to be suppressed. The voltage reduction occurs when the voltage of the switch node increases.

In an auxiliary power supply circuit according to a fourth aspect of the present disclosure, when a current flows from the reference potential node via the switch element to the switch node, a current may flow from the negative electrode of the capacitor via the diode to the negative electrode of the auxiliary power supply.

With this configuration, the current of the switch element is reduced, and therefore, conduction loss of the switch element is reduced.

A power supply apparatus according to a fifth aspect of the present disclosure includes the auxiliary power supply circuit according to any one of the aspects of the present disclosure.

With this configuration, the power supply apparatus is downsized.

A power supply circuit according to a sixth aspect of the present disclosure is a power supply circuit comprising the auxiliary power supply circuit according to an aspect of the present disclosure. The auxiliary power supply circuit is configured to receive electric power from an auxiliary power supply having a positive electrode connected to a switch node and supply electric power to a capacitor having a positive electrode connected to a reference potential node. The auxiliary power supply circuit includes a first switch element connected between the reference potential node and the switch node and a diode having an anode connected to a negative electrode of the capacitor and a cathode connected to a negative electrode of the auxiliary power supply. The voltage of the switch node is alternately switched between (i) a first voltage substantially equal to the voltage of the reference potential node and (ii) a second voltage higher than the first voltage. The power supply circuit further includes a second switch element connected to the switch node. The power supply circuit has a half-bridge configuration of the first switch element and the second switch element. The power supply circuit further includes a first coil, a first transistor element, and a first rectifier element. The positive electrode of the capacitor is connected to an anode of the first switch element and one end of the first coil. The negative electrode of the capacitor is connected to a source or an emitter of the first transistor element. The first transistor element has a drain or a collector connected to the other end of the first coil and an anode of the first rectifier element. The first switch element has a cathode connected to a cathode of the first rectifier element. The power supply circuit further includes a second coil, a second transistor element, and a second rectifier element. The positive electrode of the auxiliary power supply is connected to an anode of the second switch element and one end of the second coil. The negative electrode of the auxiliary power supply is connected to a source or an emitter of the second transistor element. The second transistor element has a drain or a collector connected to the other end of the second coil and an anode of the second rectifier element. The second switch element has a cathode connected to a cathode of the second rectifier element.

Supplementary Information

An aspect of the present disclosure is not limited to each of the embodiments described above. Various modifications may be made within the scope of the claims. Embodiments that are made by suitably combining technical elements disclosed according to the different embodiments are also included in the technical scope of an aspect of the present disclosure. Furthermore, technical elements disclosed in the respective embodiments may be combined to provide a new technical feature.

It should be understood by those skilled in the art that various modifications, combinations, sub-combinations and alterations may occur depending on design requirements and other factors insofar as they are within the scope of the appended claims or the equivalents thereof.

What is claimed is:

1. An auxiliary power supply circuit configured to receive electric power from an auxiliary power supply having a positive electrode connected to a switch node and supply electric power to a capacitor having a positive electrode connected to a reference potential node, the auxiliary power supply circuit comprising:

a switch element connected between the reference potential node and the switch node; and a diode having an anode connected to a negative electrode of the capacitor and a cathode connected to a negative electrode of the auxiliary power supply, a voltage of the switch node being alternately switched between (i) a first voltage substantially equal to a voltage of the reference potential node and (ii) a second voltage higher than the first voltage.

2. The auxiliary power supply circuit according to claim 1, wherein
the voltage of the auxiliary power supply has an absolute value less than the second voltage.

3. The auxiliary power supply circuit according to claim 1, wherein
parasitic capacitance of the diode is less than or equal to 1/20 of electrostatic capacitance of the capacitor.

4. The auxiliary power supply circuit according to claim 2, wherein
parasitic capacitance of the diode is less than or equal to 1/20 of electrostatic capacitance of the capacitor.

5. The auxiliary power supply circuit according to claim 1, wherein
when a current flows from the reference potential node via the switch element to the switch node, a current flows from the negative electrode of the capacitor via the diode to the negative electrode of the auxiliary power supply.

6. The auxiliary power supply circuit according to claim 2, wherein
when a current flows from the reference potential node via the switch element to the switch node, a current flows from the negative electrode of the capacitor via the diode to the negative electrode of the auxiliary power supply.

7. The auxiliary power supply circuit according to claim 3, wherein
when a current flows from the reference potential node via the switch element to the switch node, a current flows from the negative electrode of the capacitor via the diode to the negative electrode of the auxiliary power supply.

8. The auxiliary power supply circuit according to claim 4, wherein
when a current flows from the reference potential node via the switch element to the switch node, a current flows from the negative electrode of the capacitor via the diode to the negative electrode of the auxiliary power supply.

9. A power supply apparatus comprising
the auxiliary power supply circuit according to claim 1.

10. A power supply circuit comprising
an auxiliary power supply circuit,
the auxiliary power supply circuit being configured to
receive electric power from an auxiliary power supply having a positive electrode connected to a switch node and
supply electric power to a capacitor having a positive electrode connected to a reference potential node,
the auxiliary power supply circuit including
a first switch element connected between the reference potential node and the switch node and
a diode having an anode connected to a negative electrode of the capacitor and a cathode connected to a negative electrode of the auxiliary power supply,
a voltage of the switch node being alternately switched between (i) a first voltage substantially equal to a voltage of the reference potential node and (ii) a second voltage higher than the first voltage,
the power supply circuit further including a second switch element connected to the switch node,
the power supply circuit having a half-bridge configuration of the first switch element and the second switch element,
the power supply circuit further including a first coil, a first transistor element, and a first rectifier element,
the positive electrode of the capacitor being connected to an anode of the first switch element and one end of the first coil,
the negative electrode of the capacitor being connected to a source or an emitter of the first transistor element,
the first transistor element having a drain or a collector connected to the other end of the first coil and an anode of the first rectifier element,
the first switch element having a cathode connected to a cathode of the first rectifier element,
the power supply circuit further including a second coil, a second transistor element, and a second rectifier element,
the positive electrode of the auxiliary power supply being connected to an anode of the second switch element and one end of the second coil,
the negative electrode of the auxiliary power supply being connected to a source or an emitter of the second transistor element,
the second transistor element having a drain or a collector connected to the other end of the second coil and an anode of the second rectifier element,
the second switch element having a cathode connected to a cathode of the second rectifier element.

* * * * *